United States Patent
Keogh et al.

(10) Patent No.: US 11,310,052 B1
(45) Date of Patent: Apr. 19, 2022

(54) IDENTITY AUTHENTICATION BLOCKCHAIN

(71) Applicant: Square, Inc., San Francisco, CA (US)

(72) Inventors: Natalie Keogh, Concord, CA (US); Loren Heiman, San Anselmo, CA (US); Daniel Swislow, San Francisco, CA (US); Brian John Mullins, San Francisco, CA (US)

(73) Assignee: Block, Inc., San Francisco, CA (US)

( * ) Notice: Subject to any disclaimer, the term of this patent is extended or adjusted under 35 U.S.C. 154(b) by 822 days.

(21) Appl. No.: 16/051,367

(22) Filed: Jul. 31, 2018

(51) Int. Cl.
  *H04L 9/32* (2006.01)
  *H04L 9/06* (2006.01)
  *G06N 20/00* (2019.01)

(52) U.S. Cl.
  CPC .......... *H04L 9/3236* (2013.01); *H04L 9/0637* (2013.01); *H04L 9/321* (2013.01); *G06N 20/00* (2019.01)

(58) Field of Classification Search
  CPC ..... H04L 9/3236; H04L 9/0637; H04L 9/321; G06N 20/00
  See application file for complete search history.

(56) References Cited

U.S. PATENT DOCUMENTS

| | | | |
|---|---|---|---|
| 9,990,504 B1* | 6/2018 | Chapman | G06F 21/645 |
| 10,277,398 B2* | 4/2019 | Weimer | H04L 63/08 |
| 2003/0163737 A1* | 8/2003 | Roskind | H04L 9/3236 726/6 |
| 2010/0250937 A1* | 9/2010 | Blomquist | H04L 9/14 713/170 |
| 2017/0085562 A1* | 3/2017 | Schultz | G06K 9/00093 |
| 2020/0007333 A1* | 1/2020 | Young | H04L 63/0861 |

* cited by examiner

*Primary Examiner* — Saleh Najjar
*Assistant Examiner* — Devin E Almeida
(74) *Attorney, Agent, or Firm* — Lee & Hayes, P.C.

(57) ABSTRACT

Know your customer regulations and security concerns, among other reasons, motivate institutions to ensure that entities with whom the institutions have dealings are who they say they are. A block of the blockchain discussed herein includes entity verifications generated by institutions that participate in the blockchain. An individual verification may include a hash of personal information associated with an entity that was authenticated by an institution. An institution seeking to authenticate (or deny) an entity may receive personal information from the entity, hash that personal information, and search the blockchain for any matching verifications (e.g., by attempting to match the hashed personal information to hash(es) associated with a verification in the blockchain).

18 Claims, 8 Drawing Sheets

IDENTITY AUTHENTICATION BLOCKCHAIN

BACKGROUND

Financial institutions are required to identify their customers according to anti-money launder and anti-terrorist measures known as know your customer ("KYC") regulations. KYC may prove burdensome to businesses since ensuring that an individual is who they say they are incurs extra costs and, because of the advent of the Internet, is vastly more difficult for businesses that don't having personal, face-to-face dealings with customers. Moreover, the advent of the Internet brought with it rampant identity theft and identity spoofing, so merely confirming personal details such as, for example, a credit card account number, a home address, or a last four digits of a social security number may be insufficient to verify the identity of an individual.

BRIEF DESCRIPTION OF THE DRAWINGS

The detailed description is described with reference to the accompanying figures. In the figures, the left-most digit(s) of a reference number identify the figure in which the reference number first appears. The same reference numbers in different figures indicate similar or identical items.

DETAILED DESCRIPTION

Figure 1:
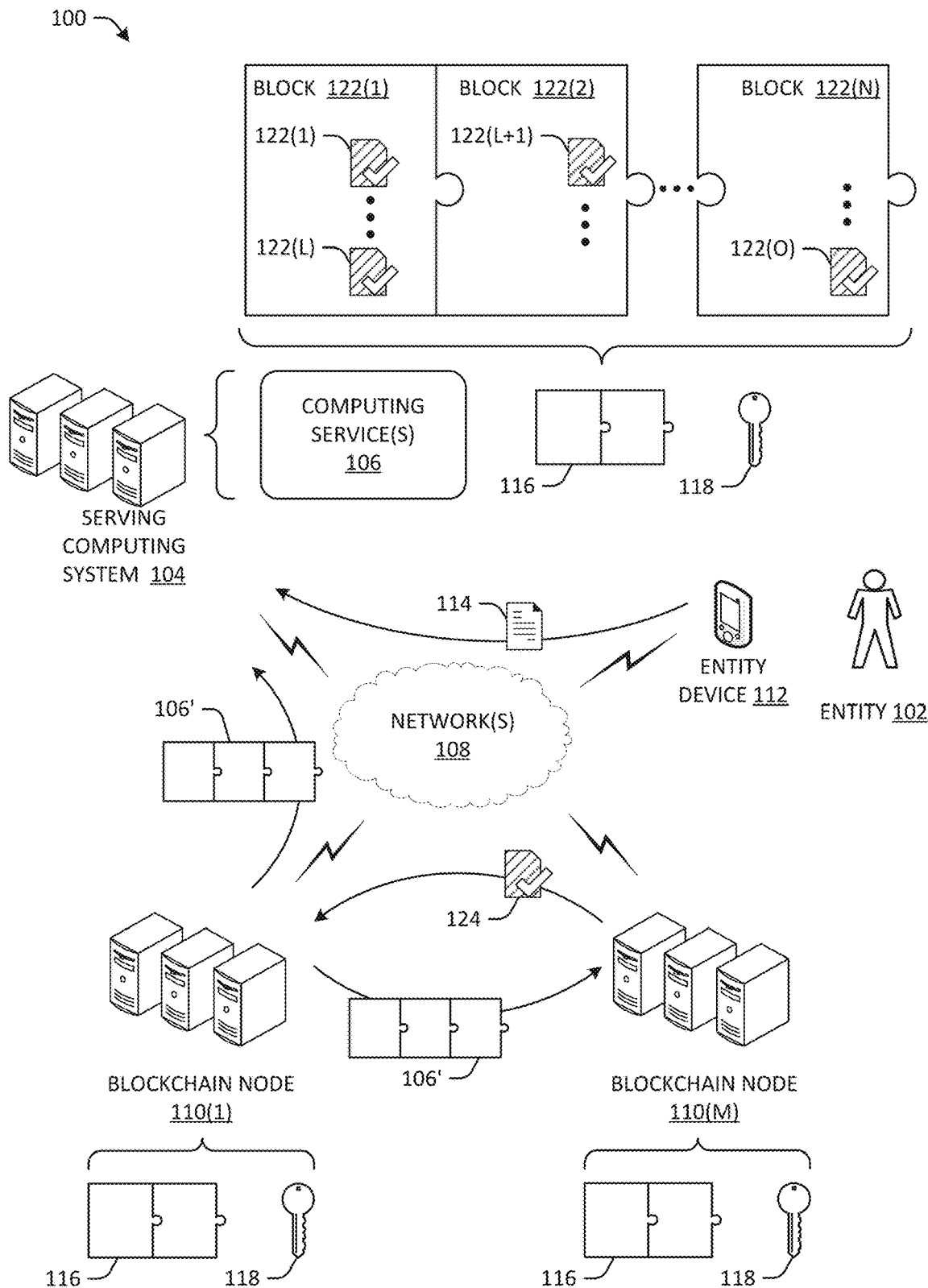
FIG. 1 illustrates a block diagram of an example environment for authenticating an identity of an entity via a blockchain system.

A variety of institutions are required by law to identify customers according to anti-terrorist and anti-money laundering laws. Other institution rigorously identify customers for security reasons, such as retaining sensitive information about customers (e.g., health information), providing secured cloud computing services, etc. The techniques described herein use a new kind of blockchain to verify customer identities. Put simply, a group of participating institutions may add blocks (or portions of blocks) to the blockchain when they verify an individual (and/or deny an individual). An institution participating in this blockchain may also use the blockchain to see if a customer has previously been verified by any other institutions and, if so, find out details about the verification. The description below details how this new blockchain works, including how to make sure no one could just go into the blockchain and look up someone's personal data. The description also includes details regarding how an institution can see if a customer has previously been verified (meaning their personal data is encrypted in the blockchain, according to the techniques described below), even though the personal data is encrypted.

This disclosure is directed to techniques (e.g., machines, processes) for authenticating an entity using a blockchain system and/or techniques for operating such a blockchain system. Techniques discussed herein may include receiving personal information from an entity such as, without limitation, the entity's name, social security number, address, phone number, etc. The techniques may include hashing this personal information and checking a copy of the blockchain described herein to see whether any blocks of the blockchain include hash(es) that match the hashed personal information. In some examples, a computing device may individually hash the personal information (e.g., generating a first hash for a social security number, a second hash for an address, a third hash for a name, and so on) and/or may generate a hash for all the information collectively (e.g., one hash for a social security number, name, and so on). The former hashes are referred to herein as "individual hashes" whereas the latter hash is referred to as a "summary hash."

In some examples, the blockchain described herein may include blocks that may include individual or multiple verifications and/or denials of entities' identities. For example, a block may include a verification of an individual entity that includes an identifier of the verification issuer (e.g., name of a bank, name of a business), the verification date (e.g., the date on which the bank or business verified the entity submitting the personal information), verification mode (e.g., what data the verification relied upon, how data was used to determine whether or not to authenticate), and hash(es) of the personal information of the individual entity. Again, these hash(es) may include individual hash(es) and/or a summary hash. As used herein, terms such as "verification mode" are understood to equally apply to denials, for the sake of simplicity, e.g., a "verification mode" may be understood to be a "denial mode" for denials.

In some examples, if the computing device finds verification(s) and/or denial(s) that contain matching hash(es) (i.e., hash(es) that match hash(es) of the personal information), the computing device may use the matching hash(es) and/or data accompanying the hash(es) (e.g., verification issuer, verification date, verification mode) to determine whether to authorize the entity for an action (e.g., open an account associated with the computing device, conduct a transaction via an electronic service associated with the computing device).

In some examples, if the computing device cannot identify any verification(s) in the blockchain that matches the hash(es) of the personal information, the computing device may deny the action and/or the computing device may transmit the personal information to a third-party computing device that operates to authenticate identities.

In some examples, the computing device may include a machine-learning model or other mechanism for using the verification(s) and/or denial(s) to determine a value that indicates a likelihood that the entity is who they say they are. The computing device may additionally or alternatively rely on matching the personal information to other data sources such as, for example and without limitation, motor vehicle records, credit bureau records, and/or other publicly available information or privately stored information, if that is available (e.g., a merchant account associated with the computing device). In some examples, if this value meets or exceeds a threshold, the computing device may authorize the entity for the action and, if the threshold value is not met the computing device may deny the action.

In some examples, the computing device may be configured to determine whether to authenticate the entity (e.g., affirm an identity of the entity asserted via the personal information received from the entity) and/or authorize an action using the blockchain data (i.e., verification(s), denial(s), a lack thereof). In some examples, different systems that access the blockchain described herein may be configured to authenticate the entity and/or authorize an action differently than each other (e.g., since the actions the different systems are authorizing may be different). For example, the different systems may use the blockchain data to authorize different actions and/or may use different scoring/determination methods to decide whether or not to authorize an action. One system might be included in servers owned by a bank that determines whether or not to authorize an entity to open an account with the bank and may use the blockchain verifications and/or denials in a machine-learning model whereas a different bank may access the blockchain for use in a scoring algorithm to determine whether to authorize an entity to open an account.

When a computing device that participates (e.g., registers with the blockchain system) in this blockchain system determines that it will allow the entity to take the action and/or authenticate (the asserted identity of) the entity, the computing device may transmit a notification of the authentication to a "nearest" (e.g., first identifiable, first to respond) blockchain miner, nearest n-number of computing devices participating in the blockchain system (i.e., "nodes," herein), all the nodes participating in the blockchain system, etc. Additionally, or alternatively, the computing device may similarly notify the blockchain system of an authentication/denial of the entity. In some examples, the notification of authentication or denial thereof may include at least hash(es) of the personal information and may additionally include an identification that the personal information was authenticated or denied, a date of the authentication/denial, an identity of the authenticator/denier, and/or other accompanying data, as discussed further herein.

Where the blockchain system employs a mining scheme, a mining computing device may receive an authentication/denial notification from a computing device participating in the blockchain system that has recently authenticated or denied another entity. The mining computing device may accumulate such notifications until a predefined number of such notifications has been received. When this predefined number is met, the mining computing device may concatenate all of the received notifications and their data, as "verifications," into a block and may repeatedly hash that block until (1) the miner finds a hash that conforms to a hash requirement specified by the blockchain system (e.g., a requirement that the hash of the block leads with a specified number of zeros, such as 26 zeros, for example), or (2) the mining device receives a notification that another miner found a hash of a block that meets the hash requirement, whichever comes first. Note that, a "verification," as used herein refers to an authentication that has been recorded in the blockchain.

If the mining computing device completes (1) before (2), the mining computing device may transmit a blockchain update notification to n-number of nearest nodes and/or miners that specifies that the hashed block that the mining computing device found is to be appended to the blockchain. The mining computing device may additionally or alternatively transmit an updated blockchain with the hashed block concatenated to the blockchain and/or the hashed block, by itself, for the other nodes to concatenate to the blockchain.

The techniques described herein may reduce a probability that an entity's personal information is leaked since the personal information is hashed and does not need to be transmitted to a third party in order to be authenticated. Instead, the techniques including hashing the personal information (which obscures the data to human comprehension and computer comprehension, without specialized hacking software or access to a private key) and attempting to match the hashed information to hashes stored in the blockchain, which doesn't include transmitting the hashed information beyond the computing device that generated the hashes.

This is particularly advantageous for security because not needing to transmit private information over a network avoids any man-in-the-middle attacks or other network-related security attacks. Moreover, not needing to transmit the private information to another computing device prevents duplication of the private information, which may increase chances of the private information being stolen from at least one of the locations at which the private information is stored. Furthermore, techniques described herein allow more control over where the private information is stored and whether it is being persistently stored. For example, a bank may know exactly where private information is stored and ensure that it isn't being stored longer than permission has been granted to possess the information (e.g., the private information is stored on the bank's servers and isn't continuing to be stored at a third-party authentication entity's servers).

These techniques may also increase the speed of determining whether to authenticate or deny an entity. For example, instead of waiting for a third-party entity to reply after conducting a search for the private information, the party seeking to authenticate an entity, for example to conform to KYC regulations, may conduct the authentication attempt at a computing device controlled by that party. Furthermore, the techniques discussed herein may reduce or eliminate the need for network bandwidth to conduct an authentication attempt (since the search through the blockchain ledger recording verifications/denials may be conducted locally and since the blockchain ledger may only be a size on the order of tens of megabytes, although less than 10 megabytes is likely) and may reduce the computational load for an authentication attempt (e.g., since requests do not need to be sent to multiple entities and cross-correlation of information received from those entities would not need to be conducted).

The techniques also allow each node that participates in the blockchain system to determine whether or not to authenticate an entity based on different techniques defined by each node, potentially. In other words, each node is free to do with the blockchain data what they will. In some examples, a variety of methods of authentication (e.g., methods that vary in "rigor" of authentication standards) may be provided to the nodes and they may choose the method and/or they may report their method so that it may be reflected in verification/denial data stored in the blockchain (e.g., in a verification mode field).

Example Environment

FIG. 1 illustrates a block diagram of an example environment 100 in which the techniques discussed herein for authenticating an identity of an entity 102 via a blockchain system may be implemented. In some examples, the example environment 100 may include a serving computing system 104 that determines whether to authenticate the entity 102. In some examples, the serving computing system 104 may include computing service(s) 106 that cause processor(s) of the serving computing system 104 to provide services such as, for example and without limitation, banking services, payment processing services, commodity/security trading services, sensitive information storage services, distributed computing and/or storage (e.g., cloud computing and/or storage), etc.

In some examples, the serving computing system 104 may be configured to communicate via network(s) 108 with one or more devices such as nodes 110(1)-(M) of the blockchain system and/or a computing device 112 associated with the entity 102 ("entity device 112"). The serving computing system 104 may itself be a node of the blockchain system and references to nodes 110(1)-(M) may be construed to mean other computing devices that are participating in the blockchain, but that may not be privy to the exchange between the entity 102 and the serving computing system 104, via the entity device 112 and the network(s) 108.

The blockchain system may comprise the serving computing system 104 and any number of nodes (e.g., computing devices) such as, for example, blockchain nodes 110(1) through 110(M). The serving computing system 104 may, itself, be considered one node of the blockchain system. In some examples, the nodes that participate in the blockchain (104, 110(1)-110(M)) may individually store a copy of the blockchain ledger 116. The nodes 110(1)-110(M) may include computing devices associated with institutions that use the blockchain to authenticate entities that interact with the institutions, without contributing verifications/denials to the blockchain (e.g., adding verifications/denials of the entities to the blockchain); nodes that are permitted to add verifications/denials to the blockchain; and/or blockchain miners that collect verifications/denials and add them, in blocks, to the blockchain ledger. It is understood that nodes may, at different times, fulfill different ones of these roles.

In some examples, the blockchain discussed herein may only include verifications and not denials. In other examples, the blockchain discussed herein may include verifications and denials.

In some examples, in order to contribute verifications and/or denials to the blockchain, the blockchain system may require the node to register and/or authenticate an institution associated with the node. For example, the blockchain system may require that an institution register by providing information about the institution (e.g., business name, IP address, governmental authorization information such as, for example, top secret clearances, a bank charter, Internal Revenue Service investment/financing authorizations), a verification mode utilized by the institution, etc. In some examples, the blockchain system may make the blockchain ledger 116 available publicly via network(s) 108 and/or may only make the blockchain ledger 116 available to registered nodes via a private network of the network(s) 108. In another example, the blockchain ledger 116 may be available publicly, but may not be added to except by known nodes. In yet another example, anyone may contribute to the blockchain ledger 116.

In some examples, the entity 102 may seek to cause an action at the serving computing system 104 that may be related to the computing service(s) 106. For example, the entity 102 may transmit a request, via the entity device 112 and to the serving computing system 104, to cause the action. The action may include examples like opening an account with the institution, conducting a transaction via the computing service(s) 106, trading commodities/securities, accessing sensitive information, storing and/or retrieving a file, using a portion of distributed computing to process a task, etc.

In some examples, seeking to accomplish this action at the serving computing system 104 may implicate KYC regulations and/or an institution associated with the serving computing system 104 may have other interests in authenticating the entity 102. For example, the action might give access to a trade secret of the institution, the action may relate to functionality of equipment that forms part of a city's infrastructure (e.g., power transmission, floodgate operation), the action opens an account with the institution, etc. The serving computing system 104 may determine that authentication of the entity 102 is required before initiating the action and may request personal information (PI) 114 from the entity 102 to determine whether to authenticate the entity 102. That is, the serving computing system 104 may validate that the entity 102 is who they say they are prior to initiating the action. In some examples, this may include transmitting instructions from the serving computing system 104 to the entity device 112 via the network(s) 108. These instructions may cause a user interface to be displayed at the entity device 112 that makes a mechanism available to input and transmit the PI 114 to the serving computing system 104.

The PI 114 may include, for example, one or more of a first name, middle name, last name, address, social security number, occupation, credit card number and/or other payment instrument identifier(s), phone number, tax identification number, birthdate, driver's license number, house number or another portion of the address, biometric data, etc.

According to the techniques discussed herein, the serving computing system 106 may participate in a blockchain system to authenticate the PI 114, at least in part, by retrieving or storing a copy of a blockchain ledger 116 from the blockchain system. The blockchain ledger 116, according to the blockchain techniques discussed herein, may include verifications and/or denials associated with different entities.

For example, an individual verification of an individual entity may be an indication, generated by a node, that the node determined to affirm that the entity was who they said they were. Conversely, a denial may be an indication, generated by a node, that the node determined to deny that they entity was who they said they were. An individual verification may include hash(es) of personal information submitted to the node from the individual entity. The hash(es) associated with the individual verification may include individual hash(es) of discrete portions of the personal information (e.g., a first hash for a social security number, a second hash for an address, a third hash for a name, and so on) and/or a summary hash of all the portions of the personal information (e.g., one hash for a social security number, name, and so on). In some examples, the same techniques may be applied to denials.

The individual verification may also include an identifier of the verification issuer (e.g., name of the institution associated with the node that generated the verification such as, for example, a bank, name of business, governmental entity), the verification date (e.g., the date on which the institution/node verified the entity submitting the personal information), verification mode (e.g., what data the verification relied upon, how (e.g., what algorithm or machine-learned model, what level of rigor) the data was used to determine whether or not to authenticate the entity), etc.

In some examples, the serving computing system 104 may use the blockchain ledger 116 to authenticate or deny the entity 102. If the serving computing system 104 authenticates the entity 102, the serving computing system 104 may authorize the entity device 112 to cause and/or complete an action at the serving computing system 104.

Authenticating, itself, may include determining to affirm that the received PI 114 rightly corresponds with the entity 102. Conversely, denying the entity 102 may include determining to reject the entity 102's affirmation that the PI 114 corresponds with the entity 102. If the serving computing system 104 denies the entity 102, the serving computing system 104 may block the entity device 112 from taking an action in respect to the serving computing system 104, transmit instructions to the entity device 112 to seek a correction to the PI 114, and/or request additional personal information from the entity 102 via the entity device 112.

In some examples, the techniques for authenticating the entity 102 may include hashing the PI 114. In some examples, the hashed personal information may include individual hashes of the PI 114 and/or a summary hash. The serving computing system 104 may use a hash function (e.g., SHA-256, any deterministic hash function with a reasonably difficult hash for which to generate a rainbow table) to convert the PI 114 to hashed personal information and may do so using a blockchain key 118. The blockchain key 118 may include a cryptographic key (e.g., a salt, a public/private key pair) and/or a formulation.

The cryptographic key may be used in the hashing function to generate the hashed personal data. In some examples, the participating nodes of the blockchain system (e.g., 104, 110(1)-110(M)) may store the blockchain key 118, including a same cryptographic key and use a same deterministic hash function, so that a hash generated by any of the nodes for identical personal information generates a same hash. For example, if "Jane Doe" is the personal information to be hashed, any of the nodes would produce a same hash for "Jane Doe" by virtue of having access to the cryptographic key (e.g., by ordering "Jane" and "Doe" according to a same formulation, e.g., no spaces and first name before last name, and/or using a same nonce as a salt for the hash function). In some examples, only registered nodes may have access to the blockchain key 118.

The blockchain key 118 may additionally or alternatively include a formulation that specifies an ordering and/or formatting of the PI 114 before it is hashed, so that a same hash may be generated by different nodes for the same personal information. For example, although a first node might receive three fields of data, "First Name: John", "Last Name: Doe", and "Social Security Number: 111-11-1111", and a second node might receive the same data in a different format, the formulation may specify that a first name and last name be hashed separately, that a name precede an address in a summary hash, that an address be followed by a social security number in a summary hash, etc. In some examples, the formulation may include instructions for causing the entity device 112 to be redirected to a web form and/or application that limits types of input and/or values of input so as to accomplish uniformity across the blockchain of personal information that should be identical, but may be represented differently while still being humanly cognizable as being the same (e.g., "MAIN AVE" and "Main Ave.").

In sum, as used herein, the blockchain key 118 may refer to the components necessary to guarantee that two different nodes that receive the same personal data would produce the same hash(es) for that data. In some examples, therefore, the blockchain key 118 may additionally include fuzzy matching and/or computer-executable instructions for presenting a request, at the entity device 112, to confirm or modify the PI 114. For example, the service computing system 104 may conduct fuzzy matching and determine that "Jhon" may be more likely, "John," and may ask for the entity 102 to confirm "Jhon" or correct the entry. Moreover, the service computing system 104 may conduct data cleaning to standardize common terms and punctuation such as, changing "Rd." or "Road" to "RD".

As discussed in more detail below, in some examples, the serving computing system 104 may search the blockchain ledger 116 to identify verifications and/or denials that are associated with hash(es) that match the hashed personal information. The serving computing system 104 may then use the matched verifications and/or denials (and data associated therewith such as, for example, issuer identity, verification date, verification mode, etc.) to determine whether to authenticate or deny the entity 102.

The blockchain ledger 116 is an example blockchain that depicts the first two blocks (120(1) and (2)) up to the N-th block of the blockchain. The blocks are depicted as puzzle pieces to represent the encryption of a block being based on the encryption of the previous blocks. In some examples, the blockchain ledger 116 may include blocks where an individual block references one or more verifications and/or denials received from nodes of the blockchain. For example, block 122(1) is the first block in the blockchain ledger 106 and includes a record of verification 122(1) through 122(L) (note that it is understood that denials may also be included in a block, but only verifications are discussed for the sake of clarity). The number of transactions recorded by a block, L, may depend on a block size specified by the blockchain scheme, which may vary based on a formulation specified by the blockchain key 118. Therefore, the number of verifications/denials recorded in a block may vary based on the size chosen for the blocks.

Verification(/denial) 124 illustrates an example of a block formation on the blockchain. A node (e.g., any of 104, 110(1)-(M)), such as node 110(M), that has recently authenticated or denied an entity via the blockchain may transmit a notification thereof as an "un-blocked verification/denial." In practice, this may mean that the node 110(M) transmits data related to the authentication as the verification 124 substantially as it appears on the blockchain 116 in a block. For example, hashed personal information may differ from an authentication/denial, in that an authentication/denial may additionally include an indication of whether the entity associated with the hashed personal information was authenticated or denied. An authentication/denial may differ from a verification, in that the verification may additionally include information such as an identifier of the verification issuer, verification date, etc.

The verification 124 may include hashed personal information and an identifier of the verification/denial issuer (e.g., an identification of the institution associated with the node), the verification/denial date, the verification/denial mode, and/or other information related to the verification/denial. In some examples, the algorithms for determining whether to authenticate an entity may be discrete and defined by the blockchain system. For example, the blockchain system is privy to the type of algorithm used to determine whether the data collected about an entity is sufficient to authenticate the entity. Where these algorithms are known, this information may be included in the "verification mode" field of the notification. In some examples, the different algorithms may be ranked by rigor and demarcated according to their rigor in the verification mode (e.g., "stringent," "loose"). In some examples, the verification mode may include statistical constraints for authenticating an entity (e.g., a threshold variation, a threshold percent of hashed personal information matched, a threshold average and/or standard deviation of age of verification dates).

In some examples, the node 110(M) may transmit a notification of the verification 124 to a "nearest" (e.g., first identifiable, first to respond, known to the node 110(M)) blockchain node, nearest mining node, nearest n-number of nodes, and/or all the nodes participating in the blockchain system. In turn, the nodes to which the node 110(M) transmitted the verification 124 may transmit the verification 124 to other nodes until the verification 124 has been substantially distributed throughout the blockchain system. In some examples, the verification 124 may be propagated to other nodes once the verification 124 has been included in a block by a mining node, as discussed below.

At least one node of the blockchain system may be a "mining node" that creates a new block from un-blocked verifications/denials. A mining node, e.g., node 110(1) in this example, may receive the verification 124 and may collect un-blocked verifications/denials and verify that the un-blocked verifications/denials accord with the blockchain key 118. For example, the mining node (e.g., 110(1)) may determine that the hashed personal information is ordered according to the formulation specified by the blockchain key 118 and/or that the notification was received from a known node (e.g., a registered node). Once the mining node verifies L number of un-blocked verifications/denials to meet the block size, the mining node has identified a potential block that could be added to the blockchain.

In order for this block to be added to the blockchain, according to the blockchain scheme the mining node must first generate a hash of the block concatenated to the blockchain (e.g., concatenated to all the previous blocks in the blockchain ledger 116). Moreover, this hash must also accord with a protocol specified by the blockchain scheme. For example, this protocol may include a number of zeros that the hash must start with. Note that this is why the blocks are represented as puzzle pieces in the figures—the hash function is applied to all the former blocks of the blockchain with the potential block concatenated at the end of the chain as the N-th block. Therefore, the hash generated is an encryption of the entire blockchain plus the potential block.

For example, the mining node may apply a hash function (e.g., SHA-256, SHA-512) to the potential block concatenated to the former blocks to generate a hash until the hash starts with a minimum number of zeros (i.e., the hash is a small number, e.g., a hash that starts with 28 zeros)). These hashes are generated randomly, so the mining node repeatedly reattempts to generate a hash that meets the hash protocol until the mining node generates a hash that meets the hash protocol or until another mining node generates a hash that meets the hash protocol, in which case the miner will start over the process of collecting, verifying, and hashing un-blocked verifications/denials. In some examples, the mining node does not use a hash function that uses the cryptographic key of the blockchain key 118 to generate the block hash, although, in other examples, the hash function may use the cryptographic key.

When a mining node finds a hash that accords with the hash protocol without first being notified that another mining node found a hash of a block of verifications/denials collected by the other mining node, the mining node transmits an announcement to other nodes of the blockchain system that the mining node found a hash for the potential block. The other computers that receive the announcement check to make sure that the hash value accords with the hash protocol and that verifications/denials of the potential block are valid (e.g., the verifications/denials include valid hashed personal information, verification issuer identifications correspond to a registered institution, hash begins with specified number of zeros). So long as these conditions are met, the other nodes add the potential block to the blockchain ledger 116 as the next block of the blockchain ledger 116, e.g., as an updated ledger 106' in FIG. 1, and continue adding blocks per this scheme. Therefore, the hash generated for the newly added block reflects the entire chain of blocks that have been accepted by the multiple nodes of the blockchain system.

Finding a hash for a block that is accepted by the other computers is called "mining" a new block herein. FIG. 1 depicts blockchain node 110(1) as mining a new block and disseminating an updated blockchain ledger 106' including the new block to other nodes of the blockchain system. It is understood that the mining node may transmit the new block, by itself, and/or an entire updated blockchain ledger that includes the new block, as in FIG. 1.

Each computer of the blockchain system may store a copy of the blockchain (i.e., sequential blocks of validated verifications/denials for which a mining node has generated a valid hash) and disseminates updates to the blockchain to the other computers of the blockchain system (e.g., when a mining node mines a new block).

Example Processes

FIGS. 2A-2G illustrate diagrams of various example processes for authenticating the identity of an entity via the blockchain system discussed herein. For example, the example processes may include (200) registering an entity and/or entity device 112 with the blockchain system, (202) registering a node with the blockchain system, attempting to verify personal information of an entity using the blockchain system (204-208), and verifying the personal information of the entity via the blockchain system (210-214).

Figure 2A:
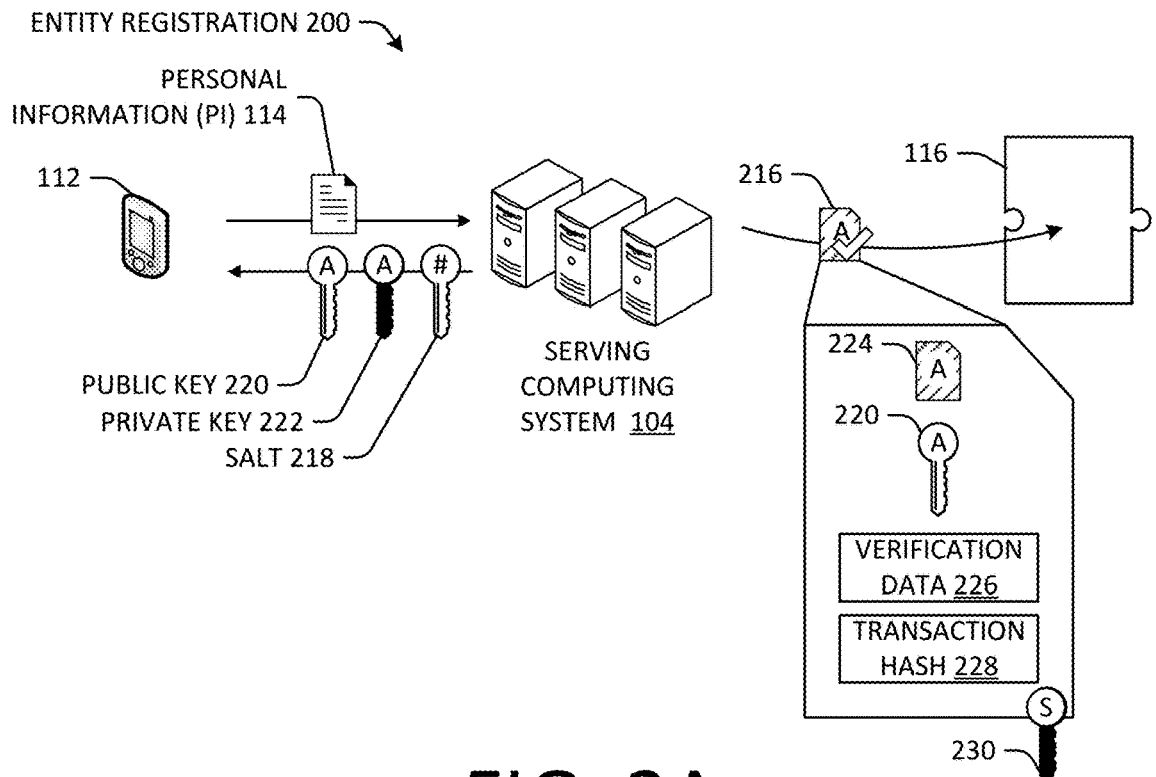
FIGS. 2A-2G illustrate block diagrams of example processes for registering an entity device; registering a blockchain node; attempting to verify, via the blockchain system, personal information associated with an entity; and verifying personal information associated with the entity via the blockchain system.

Regarding at least FIG. 2A, example process 200 may include registering an entity 102 and/or entity device 112 with a blockchain system. For example, this may include registering with a serving computing system 104 that conducts registrations for the entire blockchain system. However, to keep the blockchain system decentralized, this registration process may be conducted with any node of the blockchain system. In the blockchain system described herein a blockchain node may be associated with a party that has the capability and/or an interest in verifying the entity 102 such as, for example, a financial lender, a bank, a distributed computing/storage system, etc. In some examples, entity registration 200 may include a formal registration process and/or may merely include a first interaction an entity device 112 has with the blockchain system that results in identity verification or denial.

In some examples, the entity device 112 may transmit personal information (PI) 114 to the serving computing system 104 (which may represent any blockchain node of the blockchain system and/or a central server). The serving computing system 104 may be configured to ascertain that the PI 114 and/or the entity device 112 is new to the blockchain system such as by receiving the PI 114 pursuant to a formal registration process (e.g., by transmitting instructions to the entity device 112 to display a registration webpage and receiving the PI 114 responsive thereto, by receiving the PI 114 from an application executing at the entity device 112 that is associated with the blockchain system) and/or by searching the blockchain ledger 116 and failing to encounter a match for the PI 114 and/or a hash of the PI 114.

In some examples, the serving computing system 104 may determine to verify or deny the PI 114, according to any of the techniques discussed herein. If this is the first verification or denial associated with the entity 102, entity device 112, and/or PI 114, the serving computing system 104 may create a genesis verification/denial 216 to be included in a new block of the blockchain ledger 116. As used herein, a genesis verification/denial 216 is a first-in-time verification or denial reflected in the blockchain ledger 116 associated with a particular PI 114, as recorded in the blockchain ledger 116.

In some examples, upon determining to deny or verify the identity of the entity 102 purported by the PI 114, the serving computing system 104 may transmit a salt 218, a public key 220/private key 222 pair, and/or a blockchain protocol file to the entity device 112. In some examples, instead of transmitting a public key 220/private key 222 pair to the entity device 112, the serving computing system 104 may instruct an application stored and executing on the entity device to generate a public key 220/private key 222 pair. This public key 220/private key 222 pair may be stored and/or otherwise associated with the PI 114 in an identity wallet stored at the entity device. The identity wallet may additionally or alternatively include the salt 218. In some examples, the public key 220 and/or the salt 218 may be disseminated or available-upon-request to other devices participating in the blockchain system, but the private key 222 may be protected from dissemination by an application executing on the entity device 112. The entity device 112 may subsequently use the salt 218 to hash the PI 114 and may use the public key 220/private key 222 pair to authenticate and/or encrypt the PI 114 and/or hashed PI. In some examples, the public key 220/private key 222 pair may be used as part of the blockchain protocol as discussed in more detail below. In some examples, the salt 218 may include a random value and/or a cryptographic nonce.

In some examples, upon determining to deny or verify the identity of the entity 102 purported by the PI 114, the serving computing system 104 may generate a verification/denial 216 (for inclusion in the blockchain ledger 116) according to a protocol established by the blockchain system and disseminated to devices participating in the blockchain system. For example, this protocol may include a script, HTML file, and/or other file that constrains a verification/denial posted to the blockchain to include particular data/script(s), a zero knowledge proof protocol, and/or other protocol for communicating information associated with the blockchain to another party. Generating the verification/denial 216 according to this protocol may include:

- hashing the PI 114 to generate hashed PI 224 (e.g. using the salt 218), including the hashed PI 224 in the verification/denial 216,
- including the public key 220 associated with the entity 102 (and/or a hash of the public key 220) in the verification/denial 216,
- including verification data 226 in the verification/denial 216 (e.g., an indication that the entity was verified or denied, an identifier of the verifying/denying entity (e.g., department of licensing name, bank name, public key associated with the node, hashed public key associated with the node), a date upon which the verification/denial occurred, information relied upon to verify/deny (e.g., 3 verifications reflected in the blockchain, 2 denials reflected in the blockchain, social security number matches government records, social security number accords with biometric data)),
- hashing the data reflected in the verification (e.g., creating a hash of the hashed PI 224, the public key 220, and/or the verification data 226) and including this hash as a transaction hash 228 in the verification/denial 216, and/or
- signing the verification/denial 216 using a private key 230 associated with the serving computing system 104.

In some examples, the serving computing system 104 may include some or all of the above-mentioned data in a script stored in the blockchain ledger 116 and/or an identity wallet stored at the entity device 112. In some examples, to create the verification/denial 216, the serving computing system 104 may create a hash (transaction hash 228) of the hashed PI 224, the entity's public key 220 (and/or a hash thereof), and any verification data 226. In some examples, to create the verification/denial 216, the serving computing system 104 may create a hash (transaction hash 228) of the hashed PI 224 and the entity's public key 220 (and/or a hash thereof), and may leave the verification data 226 in plain text and/or encrypt the verification data 226 using a private key 230 associated with the serving computing system 104 (so that a participating node that has a public key associated with the serving computing system 104 may decrypt the verification data 226, thereby authenticating that the serving computing system 104 generated the verification data 226). The serving computing system 104 may, using the private key 230 associated with the serving computing system 104, sign the transaction hash 228 and/or may append a signature of the hashed PI 224, public key 220, and/or verification data 226 to the transaction hash.

By hashing the PI 114, as the hashed PI 224, the blockchain system obscures the original PI 114. A perfect, or near-perfect, hashing function may be used to prevent hash collisions and thereby prevent false matches, thereby also guaranteeing that finding a matching hash is finding matching personal information without having to expose the personal information. Inclusion of the public key 220 in the verification/denial 216 may function as a blockchain address and/or may serve as an authentication that the entity 102 associated with the public key 220 has been verified/denied. The verification data 226 may appear in the verification/denial 216 for the sake of parties seeking to use the blockchain ledger 116 to choose whether or not to verify or deny an entity seeking verification.

Figure 2B:
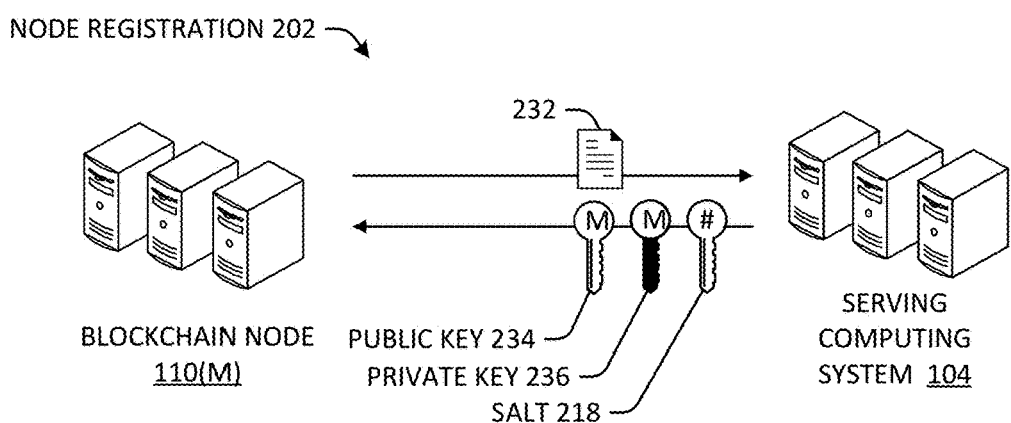

Turning to FIG. 2B, example process 202 may include registering a blockchain node 110(M). In some examples, a blockchain node 110(M) may be associated with an entity that is subject to KYC regulations and/or may have an interest in verifying entities with which the verifier deals. In some examples, the verifying entity may transmit verifier identification information 232 to the serving computing system 104 and, in exchange, the serving computing system 104, may transmit the salt 218 and/or a public key 234/private key 236 pair to the blockchain node 110(M). In some examples, the serving computing system 104 may instruct an application executing on the blockchain node 110(M) to generate the public key 234/private key 236 pair.

In some examples, the serving computing system 104 may authenticate the verifier's identity before issuing the public key 234/private key 236 and/or the salt 218. In some examples, the blockchain system protocol may include instructions that restrict posting new verifications/denials to those blockchain node(s) that have been authenticated by the serving computing system 104. In some examples, the serving computing system 104 may generate a verification to post to the blockchain ledger 116 that indicates verifier data, in place of the field that is associated with PI 114. Verifier data may include, for example, a name of the verifier, a business type of the verifier (e.g., governmental entity, bank, lender, security clearance entity), digital certificate(s) associated with the verifier, etc.

Figure 2C:
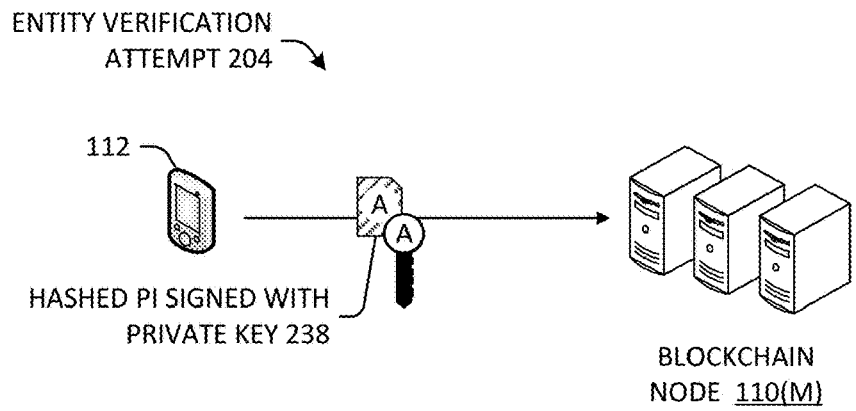

Turning to FIG. 2C, example process 204 may be used in an example where an entity 102 provides PI 114 to the serving computing system 104 via an entity device 112 via the network(s) 108, seeking to be verified, as discussed regarding FIG. 1. In some examples, the entity 102 seeking to be verified may not be aware of the fact that the entity 102 initiates process 204. For example, the entity 102 may input the entity's personal information into fields of a web page and/or may authorize transmission of identifying data stored by a social media website into which the entity is logged to be transmitted to a blockchain node 110(M) associated with a verifying entity. The entity device 112 may store and execute an application in association with the blockchain that receives the personal information, however that is obtained, and may transmit the personal information (e.g., PI 114) to the blockchain node 110(M) associated with the part with which the entity 102 is interacting. In some examples, transmitting the PI 114 may include hashing the PI 114 using the salt 218 (which may be stored in an identity wallet stored at the entity device 112 and/or obtained from the blockchain node 110(M)). In some examples, transmitting the PI 114 may additionally or alternatively include signing (238) the PI 114 or hashed PI with the private key 222 associated with the entity 102 and stored in the identity wallet at the entity device 112.

Figure 2D:
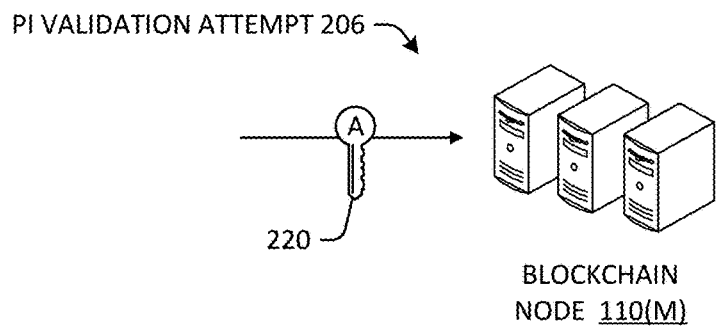

Turning to FIG. 2D, in examples where the personal information is signed using the private key 222 associated with the entity 102, the blockchain node 110(M) may obtain the public key 220 to decrypt the signed PI. A successful decryption of the PI may indicate that the PI data authentically came from the entity device 112/entity 102. In some examples, the public key 220 may be available to the blockchain node 110(M) upon request to the entity device 112, from a digital certificate storing the public key 220, from a repository of public keys associated with the blockchain system, etc. In some examples, the entity device and/or the blockchain node 110(M) may be associated with an identifier which may include a hash of a public key associated therewith.

Figure 2E:
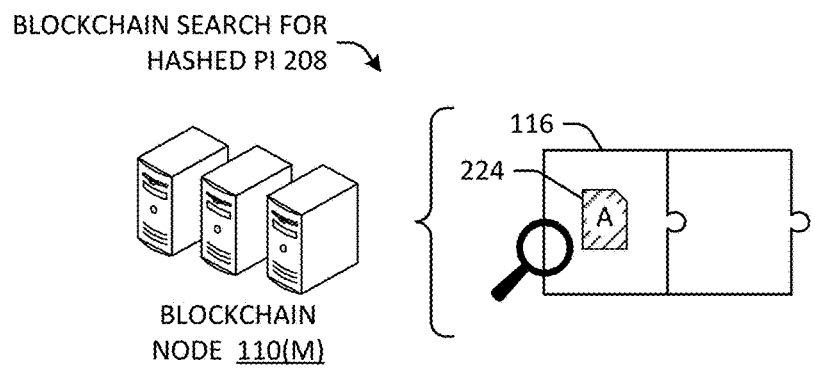

Turning to FIG. 2E, example process 208 may include searching for a PI match using the PI data received from the entity device 112. For example, the blockchain node 110(M) may search for a block that includes a hashed PI that matches hashed PI data received from the entity device 112. In some examples, where the PI information received from the entity device 112 isn't already hashed, the blockchain node 110(M) may hash the PI data using the salt 218 before conducting the search.

Figure 2F:
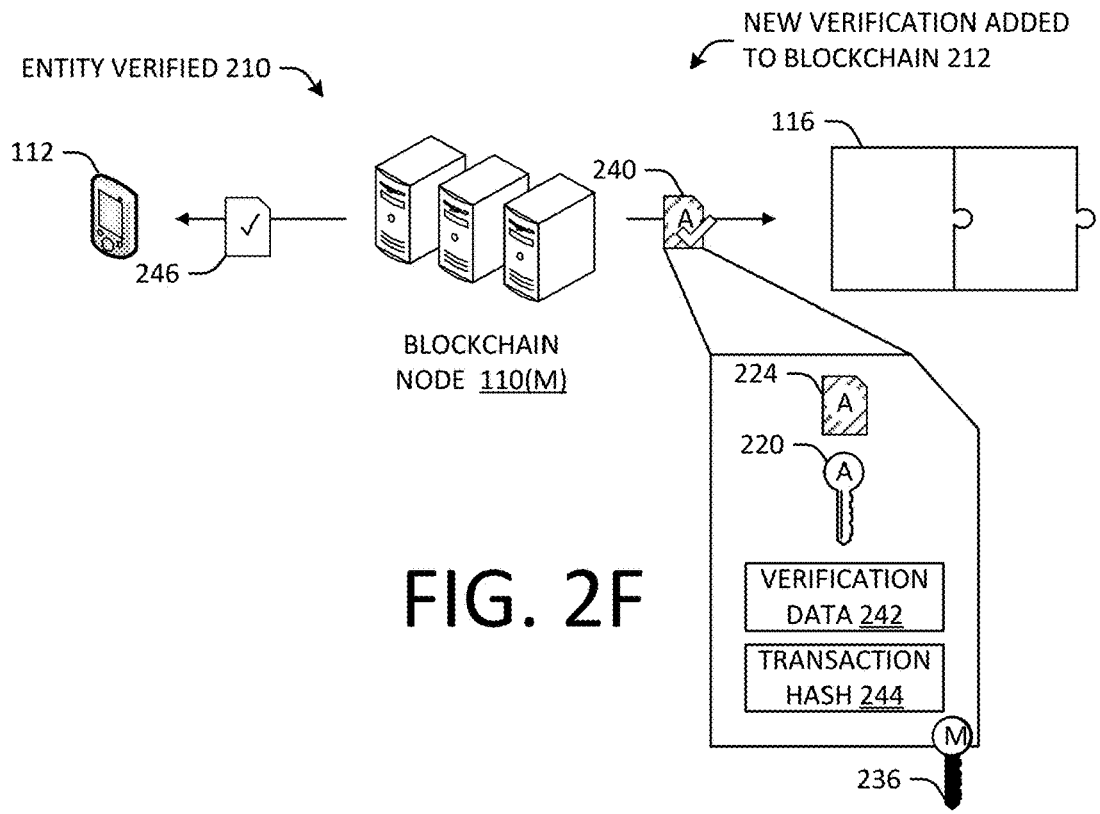

Turning to FIG. 2F, example process 210 may include verifying the entity 102. In some examples, the blockchain node 110(M) may determine to verify the entity 102 based on the PI data received from the entity device 112. In this instance, the blockchain node(M) may generate a verification 240 and post the verification to the blockchain ledger 116 (e.g., transmit the verification 240 to a "nearest" mining node for inclusion in a new block of the blockchain ledger 116). The blockchain node 110(M) may generate the verification 240 based at least in part on including the hashed PI 224, the public key 220 associated with the entity 102, and/or verification data 242 in the verification 240. In some examples, the verification data may include any of the verification data discussed herein and additionally or alternatively, when a blockchain node 110(M) discovers block(s) that contain matching hashed PI 224, the blockchain node 110(M) may include a reference to an address of those transactions and/or blocks in the verification data 242. In some examples, this may include a hash of the public key associated with entity device 112. Any of this data may be hashed to generate a transaction hash 244, as discussed herein. In some examples, the transaction hash 244 may be signed by the blockchain node 110(M) using a private key 236 associated with the blockchain node 110(M). This new verification may then be added (212) to the blockchain ledger 116 by a mining node, as discussed further in regard to at least FIG. 4. In some examples, the blockchain node 110(M) may then transmit a notification 246 of the verification to the entity device 112, which may include instructions to allow the entity device 112 to perform an action.

Figure 2G:
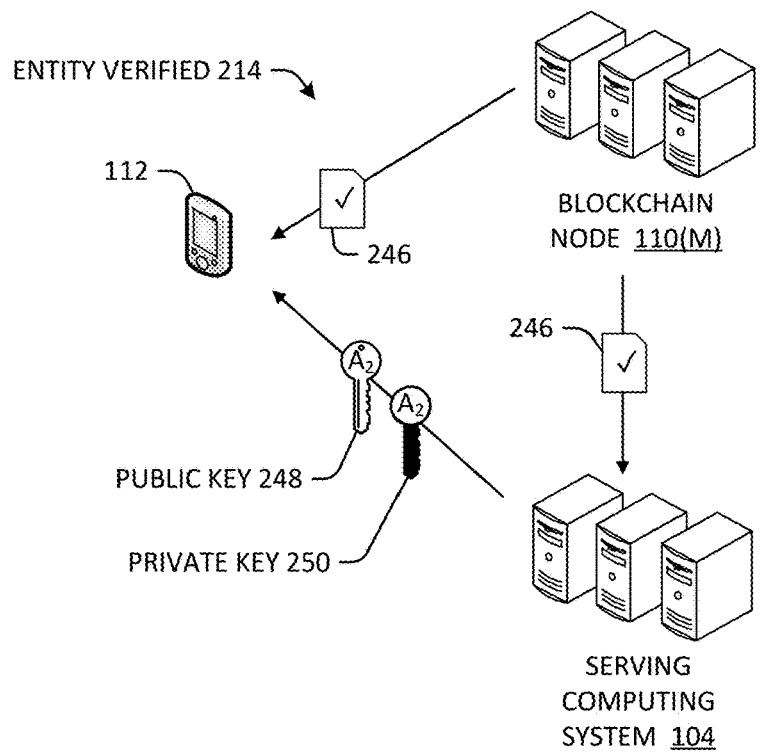

Turning to FIG. 2G, example process 214 may include an additional or alternate implementation of process 210. In some examples, upon verifying the entity device 112, the blockchain node 110(M) may cause the entity device 112 to receive a new public key 248/private key 250 pair. In some examples, this may include transmitting the notification 246 to the serving computing system 104, which then transmits the new public key 248/private key 250 pair to the entity device 112 or, in another example, the notification 250 may include instructions that cause an application executing on the entity device 112 to create the public key 248/private key 250 pair.

According to the blockchain protocol referenced in FIG. 2G, an entity device may obtain a new public key/private key pair for a successful verification and/or a denial. In this example, the application executing on the entity device 112 may be a deterministic function that uses the hashed PI information associated with the entity device 112 incremented by the number of verifications/denials associated with the entity device 112 thus far as a salt so that public key/private key pairs generated by different devices are distinct. This may allow a hash of the public key associated with an entity device 212 to be used as an address for the verification/denial and/or as a means of authenticating the verification/denial's association with the entity device 212. In this example, the application running on the entity device 112 may use the newest public key/private key pair for a new verification attempt.

Example Process

Figure 3A:
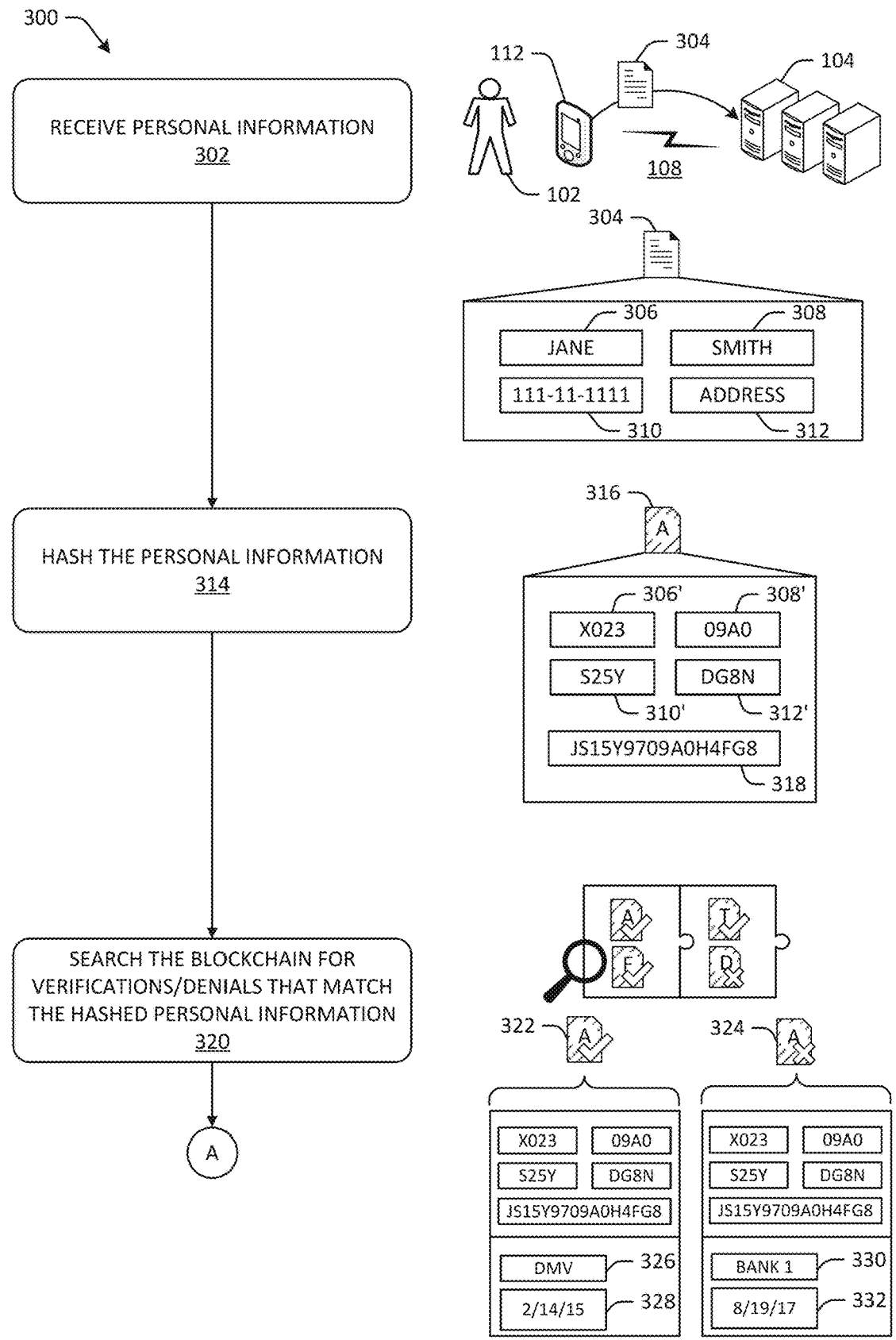
FIGS. 3A and 3B illustrate a pictorial flow diagram of an example process for authenticating the identity of an entity via the blockchain system discussed herein.
Figure 3B:
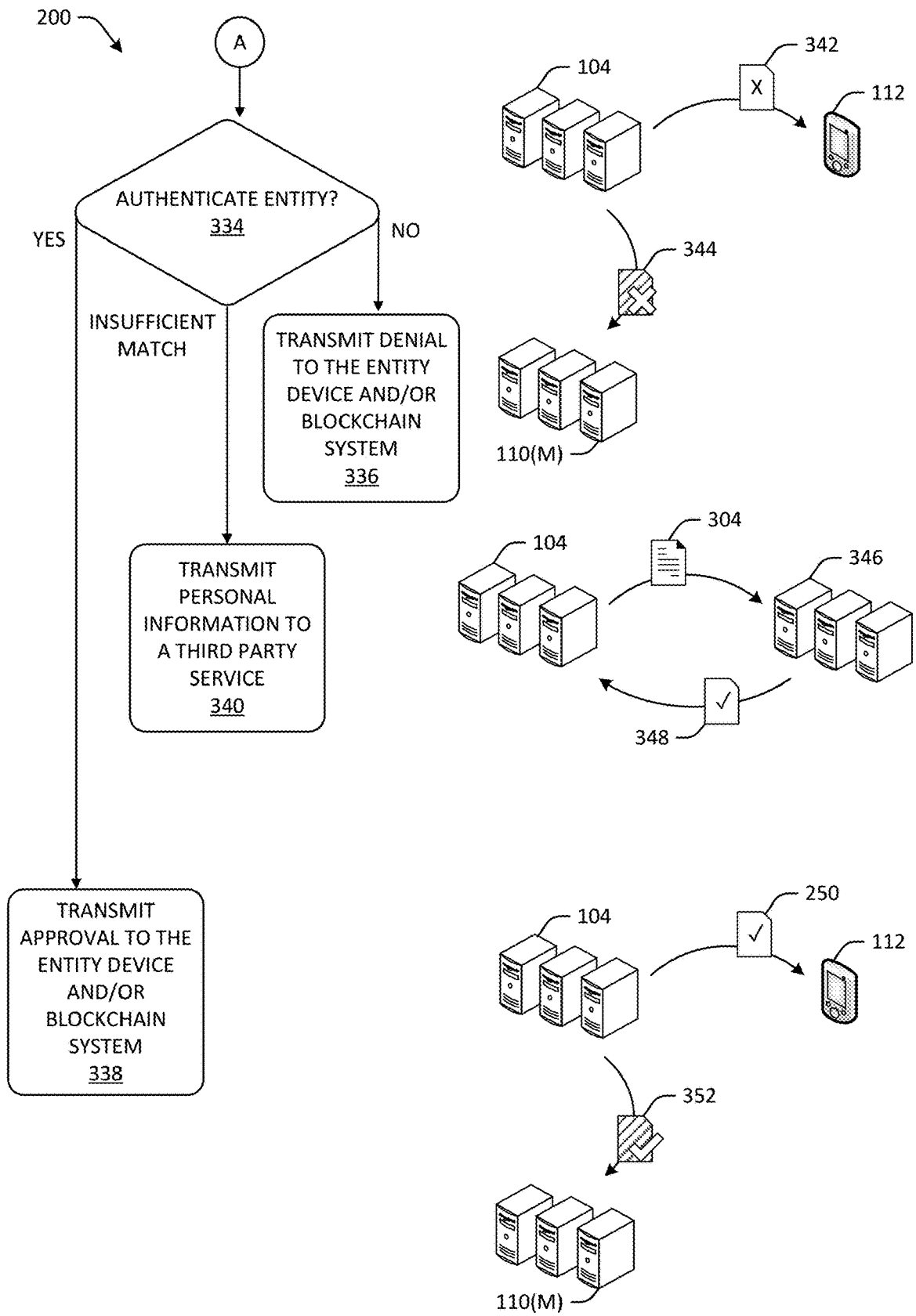

FIGS. 3A and 3B illustrate a pictorial flow diagram of an example process 300 for authenticating the identity of an entity via the blockchain system discussed herein. Example process 300 may be used in an example where an entity 102 provides PI 114 to the serving computing system 104 via an entity device 112 via the network(s) 108.

At operation 302, the example process 300 may include receiving, at a serving computing system 104, personal information (PI) 304 associated with the entity 102, according to any of the techniques discussed herein. Example PI 304, may represent PI 114 and/or PI 224. In some examples, the PI 304 may be received responsive to presentation of a user interface (UI) at the entity device 112. For example, the UI may be part of a product provided by the computing service(s) 106. Example PI 304 depicts four example fields of personal information received: a first name 306, "JANE;" a last name 308, "SMITH;" a social security number 310, "111-11-1111;" and an address 312, "ADDRESS."

At operation 314, the example process 300 may include hashing the PI 114 as hashed information 316, according to any of the techniques discussed herein. In the depicted example, the hashed personal information 316 includes individual hashes of the personal information, individual hash 306', which is an example hash of first name 306; individual hash 308', which is an example hash of last name 308; individual hash 310', which is an example hash of social security number 310; and individual hash 312', which is an example hash of address 312. The depicted example also includes a summary hash 318, which may represent an amalgamation of the PI 304 according to a formulation defined by the blockchain system. For example, the formulation may specify that the personal information is to be amalgamated in all capitals, without punctuation in order of [First Name] [Last Name] [Address] [Social Security Number], etc. In some examples, the summary hash may be a hash of a subset of the personal information (e.g., first name, last name, and social security number), even when a middle name or other information is available. The personal information chosen for the summary hash may be predefined by the formulation and may be set to be a least amount of personal information that should always be available and that may distinguish an entity from over 80% or 90% of other personal information. This may expedite finding potential matches. In some examples, the hashed PI 316 may include only a summary hash and the match requirement may be a perfect match of the summary hash to a hash in the blockchain ledger, as discussed below.

In some examples, the hash function for hashing the PI 304 may be a deterministic hash function, meaning that the function is designed such that any node of the blockchain would produce the same hashes for the same data (e.g., any node, given PI 304, would identically generate hashed personal information 316 using the hash function) and would, optimally, not create a same hash for different PI (collision-resistant). The hash function may be a collision-free hashing function and/or more use a same salt as other nodes of the blockchain system in order to generate a same hash for identical PI.

In some examples, the example process 300 may include data cleaning, fuzzy matching, and/or requesting corrections and/or affirmations of the personal information before hashing the personal information. For example, this may further ensure that data that is truly the same is reflected by a same hash. A human may be able to understand that "Main Ave" is the same as "MAIN AVE" or "Main Avenue," but these three permutations, that should be recognized as being the same, would generate three different hashes.

At operation 320, the example process 300 may include hashing searching the blockchain for one or more verifications and/or one or more denials that are associated with hash(es) that match the hashed personal information 316, according to any of the techniques discussed herein. In some examples, this may include retrieving a copy of blockchain ledger 116 (e.g., from another node, from memory of the serving computing system 104). For example, example process 300 may include attempting to match individual hashed personal information 306', which corresponds to a first name field, to an individual hash of a first name field indicated by a verification or denial. In some examples, example process 300 may include attempting to find an identical match to the summary hash 318 first and then individual hashes (e.g., 306'-312' in this example).

In some examples, the example process 300 may determine that a verification/denial is a match based at least in part on determining that hashes indicated by the verification/denial meet a match protocol specified by the serving computing system 104 and/or the blockchain system. The match protocol may include a requirement that all the individual hashes of the hashed personal information 316 match the individual hashes of the verification/denial found, the summary hash of the hashed personal information 316 matches the summary hash of the verification/denial found, that particular individual hashes match (e.g., first name, last name, and social security number or first name, last name, address, phone number, and drivers license number, or first name, last name, address, occupation, cell number, address, previous address), that a threshold percentage and/or number of hashes match. In some examples, determining a match may include determining a score and/or weight based at least in part on data matching techniques. A "match" may include data that the data matching technique determines a score and/or weight the meets or exceeds a match and/or similarity value threshold. For example, the data matching technique for generating a score and/or weight between the hashed personal data and a hash stored in the blockchain may include generating a blocking key for partitioning hashes and/or verifications, sorted neighborhood techniques, Needlemann and Wunsch edit distance metrics, the Jaccard metric, etc.

In some examples, searching for verifications that match the hashed personal information 316 may include searching for matches to hashes of the top x (e.g., 10, 50) number of misspellings of the PI 304.

FIG. 3A depicts an example verification 322 and an example denial 324 that match the personal information 316. In the depicted example, the example verification 322 and the example denial 324 are both associated with hashed personal information that perfectly matches the hashed personal information 316, although it is understood that this may not always be the case, as discussed above. Example verification 322 also includes additional information related to the verification (e.g., "verification information" such as 226 and 242)—an identifier of the verification issuer 326, "DMV," a department of motor vehicles, and a verification date 328, "2/14/15." Example denial 324 includes an identifier of the verification issuer 330, "BANK 1," and a verification date 332, "8/19/17." It is contemplated that the additional information about the verification may include more fields, but FIG. 3A only depicts these fields for simplicity.

At operation 334, depicted in FIG. 3B, example process 300 may include determining whether or not to authenticate the entity based at least in part on the matching verifications/denials and/or a lack thereof, according to any of the techniques discussed herein. In some examples, each node of the blockchain system may conduct this operation differently. In some examples, the mode by which a node authenticates or denies an entity may be reflected in verifications/denials in the blockchain. This determination may include a scoring function, a machine-learning model that receives the verification data is input, a heuristic (e.g., a predefined number of verifications within a time period results in authentication, a predefined number of denials within a time period results in denial), etc. For example, the serving computing system 104 may determine to authenticate the entity if the serving computing system matches 3 or more verifications that have dates within the last 12 months. In another example, the serving computing system 104 may include a scoring function that takes the verification/denial data as input and outputs a score (e.g., the scoring function may weight different verification data differently such as, the issuer identifier, the verification mode, the verification date, and may assign different scores to different values of the verification mode, e.g., a lower score for verification dates older than a year ago and a higher score for verification dates more recent than a year ago).

Depending on the algorithm used, the serving computing system 104 may determine to deny the entity example process 300 may proceed to operation 336 (e.g., a score generated from the verification/denial data does not exceed a threshold score, number of denials within a time period exceeds a threshold value, number of verifications within a time period does not meet a threshold value, machine-learned model outputs a negative indication). Conversely, if the serving computing system 104 determines to authenticate the entity, the example process 300 may continue to operation 338. In some examples, if no verifications/denials are matched and/or not enough or recent enough verifications/denials are matched then example process 300 may proceed to operation 340. In some examples, serving computing system 104 may request additional personal information, where the entity doesn't qualify to be authenticated (e.g., request picture of driver's license At operation 336, the example process 300 may include transmitting an indication 342 of the denial 344 to the entity 102 via network(s) 108 and the entity device 112, according to any of the techniques discussed herein. Based at least in part on the denial, the serving computing system 104 may block the entity device 112 from completing an action. The serving computing system 104 may additionally, or alternatively, transmit the denial 344 to at least one node of the blockchain system (e.g., node 110(M)). The denial 344 may include the hashed personal information 316 and denial data such as, for example, an identification of an entity associated with the serving computing system 104, a denial date, denial mode, etc.

At operation 338, the example process 300 may include transmitting an indication 350 of the authentication 352 to the entity device 112, according to any of the techniques discussed herein. In some examples, the serving computing device 104 may, at least, initiate an action requested by the entity device 112 and/or make the action available for initiation and/or completion by the entity device 112. For example, the serving computing device 104 may allow the entity device 112 to open an account in association with computing service(s) 106, complete a transaction, access data, etc. In some examples, transmitting the indication 350 to the entity device 112 may additionally include transmitting instructions to the entity device 112 effective to allow the entity device 112 to complete the action.

At operation 340, the example process 300 may include transmitting the PI 304 to a third-party authentication service 346 that may respond with an authentication/denial 348 of the entity 102, according to any of the techniques discussed herein. In some examples, the example process 300 may include transitioning from operation 336 to operation 338.

In some examples, the example process 300 may additionally or alternatively include transmitting the authentication 352 to at least one node of the blockchain system (e.g., node 110(M)). This node may relay the authentication 352 to other nodes and/or incorporate the authentication 352 into a new block.

Example Mining Process

Figure 4:
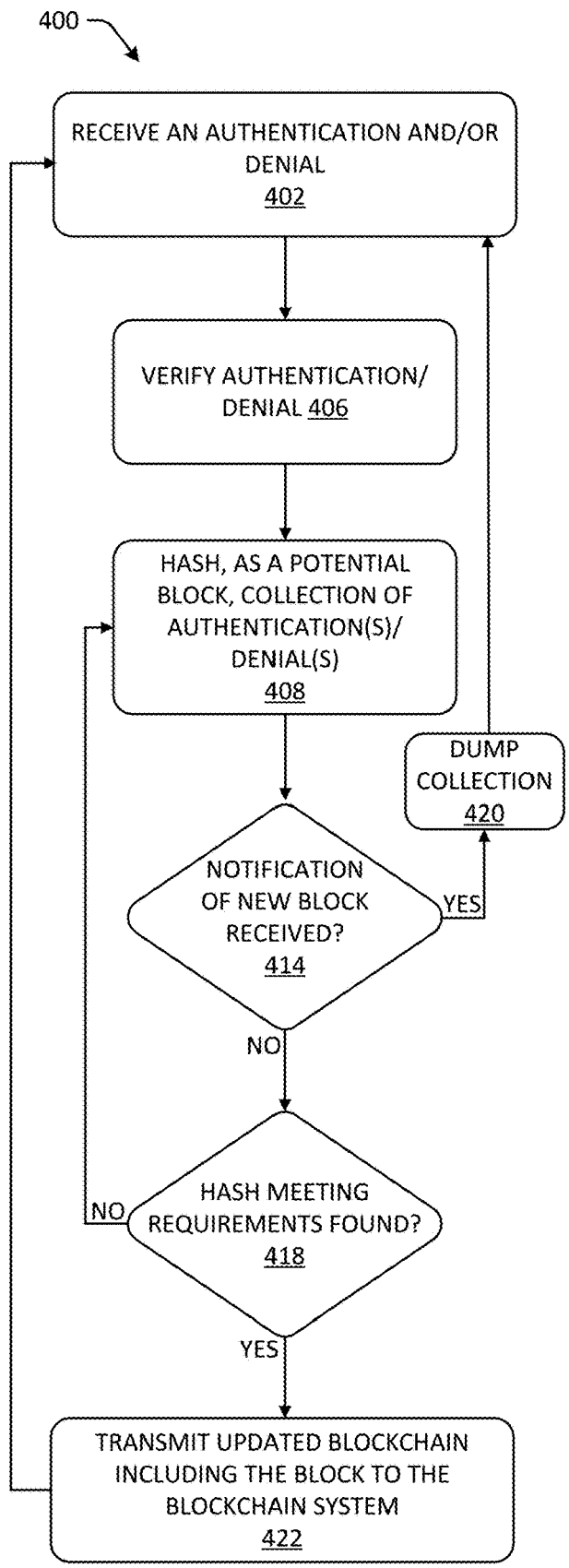
FIG. 4 illustrates a pictorial flow diagram of an example process for generating a block for the blockchain system described herein.
Figure 4:
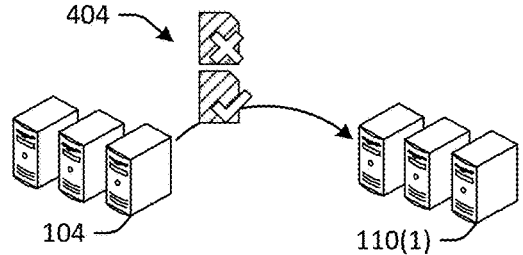
Figure 4:
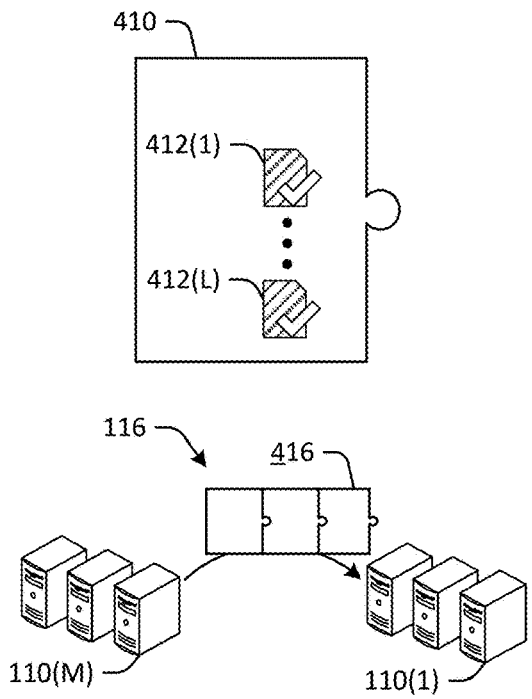
Figure 4:
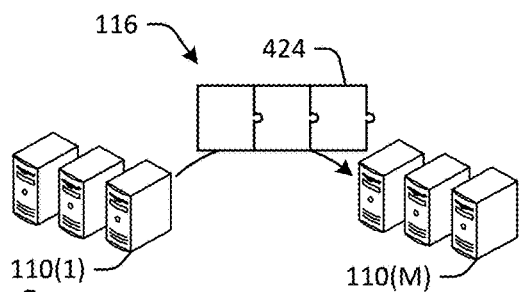

FIG. 4 illustrates a pictorial flow diagram of an example process 400 for generating a block for the blockchain system described herein. In some examples, example process 400 may be conducted at a blockchain node that is operating, at least in part, as a mining node (e.g., node 110(1) in this example).

At operation 402, example process 400 may include receiving authentication/denial 404 from another node of the blockchain system, according to any of the techniques discussed herein. For example, node 110(1) may have received the authentication/denial 404 via a broadcast of the authentication/denial 404 by the serving computing device 104 (or any other node) to one or more nearest nodes to the serving computing device 104.

At operation 406, example process 400 may include verifying that the received authentication/denial 404 accords with a protocol of the blockchain, according to any of the techniques discussed herein. For example, operation 406 may include verifying that the authentication/denial 404 was generated by a registered node/institution, that the personal information was hashed correctly from the cryptographic key, etc. Operation 406 may further include collecting verified authentications/denials until a number of the verified authentications/denials equals a block size specified by the blockchain system/the formulation of the blockchain key 118.

At operation 408, example process 400 may include hashing, as a potential block 410, the collection of verified authentications/denials 412(1)-(L), according to any of the techniques discussed herein. In some examples, the generated hash may be a hash of the potential block concatenated to the currently known blocks of the blockchain ledger.

Example process 400 may continue to repeat operation 408 until (operation 414) a notification is received that a new block 416 has been added to the blockchain ledger 116 (e.g., another mining node found a hash that conforms to the blockchain hash requirements) or until (operation 418) the node 110(1) generates a hash for the potential block 410 that conforms to the hash requirements.

If a notification that a new block has been added to the blockchain is received before the node 110(1) generates a hash that conforms to the hash requirements, then the example process 400 may continue to operation 420, which may include dumping any authentications/denials reflected in the new block, collecting new authentications/denials, and continuing to attempt to generate a hash that conforms to the hash requirements.

If no notification of a new block is received before the node 110(1) generates a hash that conforms to the hash requirements, then the example process 400 may continue to operation 422, which may include transmitting a notification of a new block 424 to another node of the blockchain system (e.g., node 110(M)). In some examples, this may include transmitting the new block 424 to the other node and/or transmitting an updated copy of the blockchain ledger 106' that includes the new block 424.

Example System Architecture

Figure 5:
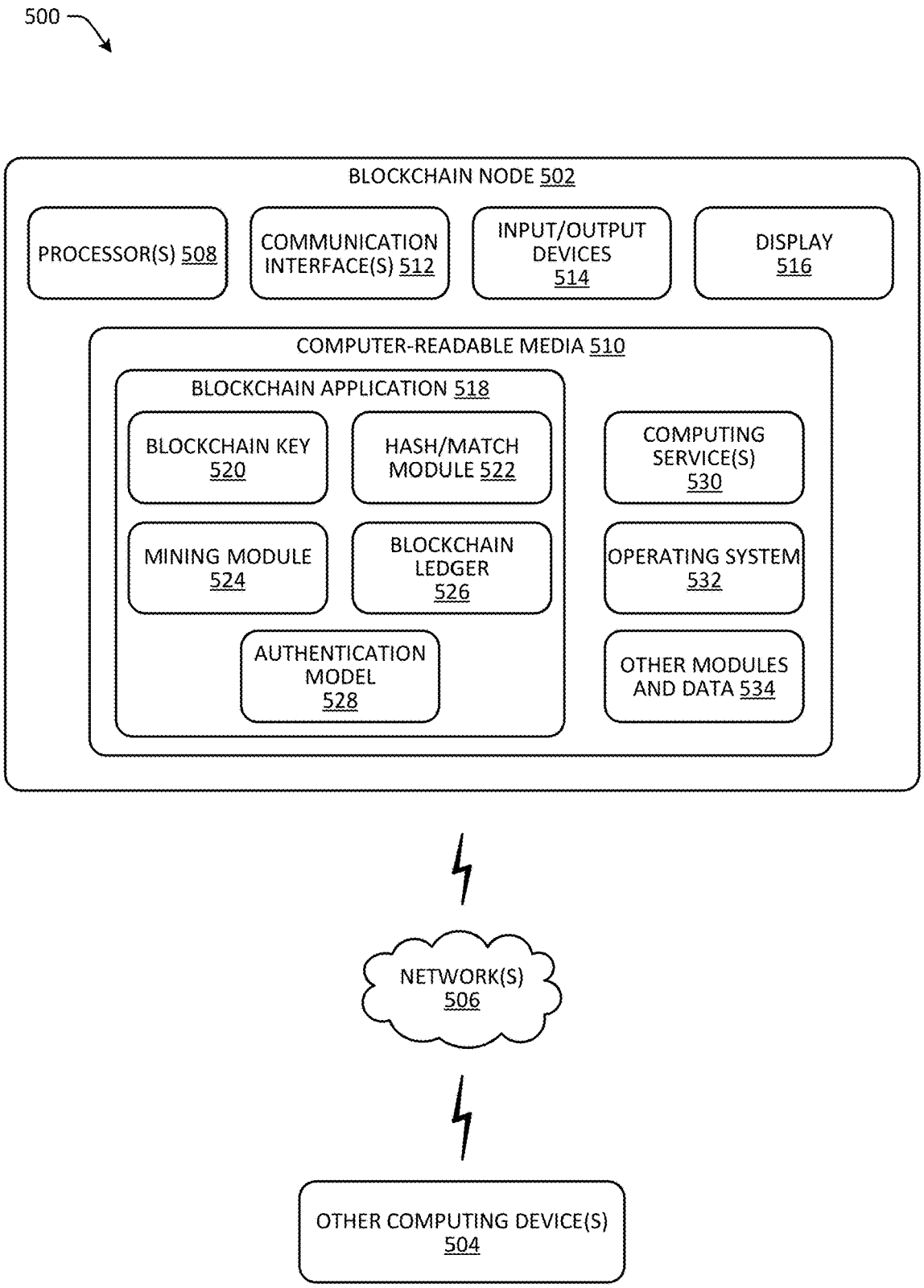
FIG. 5 illustrates an example system architecture of the blockchain system discussed herein, including an example blockchain node for authenticating an entity via the blockchain system.

FIG. 5 illustrates an example architecture 500 of the blockchain system discussed herein, including an example blockchain node 502 for authenticating an entity via the blockchain system. The example blockchain node 502 may represent any node of the blockchain system, regardless of what functions the node fulfills (e.g., whether the node merely accesses the blockchain ledger to conduct authentication without contributing verifications/denials to the blockchain, the node contributes verifications/denials to the blockchain (e.g., the node is registered), the node additionally or alternatively conducts mining). For example, the example blockchain node 502 may represent any one or more of serving computing device 104 and/or node 110(1)-(M).

The example architecture 500 may include example blockchain node 502, which may communicate with other computing device(s) 504 via network(s) 506 (e.g., the Internet, cable network(s), cellular network(s), wireless network(s) (e.g., Wi-Fi) and wired network(s), as well as close-range communications such as Bluetooth®, Bluetooth® low energy, and the like). In some examples, the other computing device(s) may include other nodes of the blockchain system and/or an entity device such as, for example, entity device 112. Network(s) 506 may correspond to network(s) 108.

In at least one example, the example blockchain node 502 may be any suitable type of computing device, e.g., portable, semi-portable, semi-stationary, stationary, distributed (cloud) computing device(s). Some examples of the example blockchain node 502 may include tablet computing devices; smart phones and mobile communication devices; laptops, netbooks and other portable computers or semi-portable computers; desktop computing devices, terminal computing devices and other semi-stationary or stationary computing devices; dedicated register devices; wearable computing devices, or other body-mounted computing devices; augmented reality devices; distributed (cloud) computing device(s), or other computing devices capable of sending communications and performing the functions according to the techniques described herein. In some examples, the example blockchain node 502 may include one or more servers or other types of computing devices that can be embodied in any number of ways. For example, in an example of a server, hardware, functional components, and data discussed herein can be implemented on a single server, a cluster of servers, a server farm or data center, a cloud-hosted computing service, a cloud-hosted storage service, and so forth, although other computer architectures can additionally or alternatively be used.

Further, while the figures illustrate the components and data of the example blockchain node 502 as being present in a single location, these components and data may alternatively be distributed across different computing devices and different locations in any manner. Consequently, the functions may be implemented by one or more serving computing systems, with the various functionality described above distributed in various ways across the different computing devices. Multiple serving computing device(s) may be located together or separately, and organized, for example, as virtual servers, server banks and/or server farms. The described functionality may be provided by the servers of a single entity or enterprise, or may be provided by the servers and/or services of multiple different customers or enterprises.

In the illustrated example, the example blockchain node 502 includes one or more processors 508, one or more computer-readable media 510, one or more communication interfaces 512, one or more input/output (I/O) devices 514, and/or display 516.

Each processor 508 may itself comprise one or more processors or processing cores. For example, the processor(s) 508 may be implemented as one or more microprocessors, microcomputers, microcontrollers, digital signal processors, central processing units, state machines, logic circuitries, and/or any devices that manipulate signals based on operational instructions. In some examples, the processor(s) 508 may be one or more hardware processors and/or logic circuits of any suitable type specifically programmed or configured to execute the algorithms and processes described herein. The processor(s) 508 may be configured to fetch and execute computer-readable processor-executable instructions stored in the computer-readable media 510 to conduct any of the operations discussed herein.

Depending on the configuration of the example blockchain node 502, the computer-readable media 510 may be an example of tangible non-transitory computer storage media and can include volatile and nonvolatile memory and/or removable and non-removable media implemented in any type of technology for storage of information such as computer-readable processor-executable instructions, data structures, program modules or other data. The computer-readable media 510 may include, but is not limited to, RAM, ROM, EEPROM, flash memory, solid-state storage, magnetic disk storage, optical storage, and/or other computer-readable media technology. Further, in some examples, the example blockchain node 502 may access external storage, such as RAID storage systems, storage arrays, network attached storage, storage area networks, cloud storage, or any other medium that can be used to store information and that can be accessed by the processor(s) 508 directly or through another computing device or network. Accordingly, the computer-readable media 510 may be computer storage media able to store instructions, modules or components that can be executed by the processor(s) 508. Further, when mentioned, non-transitory computer-readable media exclude media such as energy, carrier signals, electromagnetic waves, and signals per se.

The communication interface(s) 512 may include one or more interfaces and hardware components for enabling communication with various other devices, such as over the network(s) 506 or directly. For example, communication interface(s) 512 may enable communication through one or more of the Internet, cable networks, cellular networks, wireless networks (e.g., Wi-Fi) and wired networks, as well as close-range communications such as Bluetooth®, Bluetooth® low energy, and the like, as additionally enumerated elsewhere herein.

The example blockchain node 502 may further include the one or more I/O devices 514. The I/O devices 514 may include speakers, a microphone, a camera, a global-positioning system (GPS) device able to indicate location information, an accelerometer, gyroscope, compass, proximity sensor, and/or a switch, various user controls (e.g., buttons, a joystick, a keyboard, a keypad, etc.), a haptic output device, and so forth. Additionally, the example blockchain node 502 may include various other components that are not shown, examples of which include removable storage, a power source, such as a battery and power control unit, a barcode scanner, a printer, a cash drawer, and so forth. In some examples, the GPS device may be used to authenticate an institution that is registering a node.

In at least one example, example blockchain node 502 may include a display 516. Depending on the type of computing device(s) used as the example blockchain node 502, the display 516 may employ any suitable display technology. For example, the display 516 may be a liquid crystal display, a plasma display, a light emitting diode display, an OLED (organic light-emitting diode) display, an electronic paper display, or any other suitable type of display able to present digital content thereon. In some examples, the display 516 may have a touch sensor associated with the display 516 to provide a touchscreen display configured to receive touch inputs for enabling interaction with a graphic interface presented on the display 516. Accordingly, implementations herein are not limited to any particular display technology. Alternatively, in some examples, example blockchain node 502 may not include the display 516, and information can be presented by other means, such as aurally.

The computer-readable media 510 may be used to store and maintain any number of functional components that are executable by the processor(s) 508. In some implementations, these functional components comprise instructions or programs that are executable by the processor(s) 508 and that, when executed, implement operational logic for performing the actions and services attributed above to the example blockchain node 502. Functional components stored in the computer-readable media 510, that may be executed by the processor(s) 508 to cause the processor(s)

508 to cause operations discussed herein, may include a blockchain application 518, which may include a blockchain key 520 (e.g., if the blockchain application 518 is registered), which may represent blockchain key 118; a hash and/or match module 522; mining module 524 (e.g., if the example blockchain node 502 is being used to mine new blocks); a copy of the blockchain ledger 526, which may represent blockchain ledger 116; and/an or authentication model 528.

In some examples, the functional components stored in the computer-readable media 510 may additionally or alternatively include computing service(s) 530, which may represent computing service(s) 106; an operating system 532; and/or other modules and data 434, which may include programs, drivers, etc., and the data used or generated by the functional components. In some examples, the computing service(s) 106 may include a payroll module, an inventory management module, an employee management module, a financing module, an appointment module, a transaction processing module, a contract formation module, a cloud storage module, a cloud processing module, a securities exchange module, a secured communications channel module, etc. The operating system 530 may control and manage various functions of the example blockchain node 502 and for enabling basic user interactions. In addition, the computer-readable media 510 may also store data, data structures and the like, that are used by the functional components.

In some examples, the example blockchain node 502 may receive the blockchain key 520 responsive to successfully registering with the blockchain system. For example, registration may include providing information regarding an institution associated with the blockchain node (e.g., name of a business/governmental institution, address, copy of a bank charter) and may include submitting corroboration data such as, for example location coordinates sensed by a GPS device of the blockchain node 502, digital credentials (e.g., a certificate), a response from a secured account (e.g., activating a link sent to an email account, activating a user interface mechanism displayed via an application responsive to the attempt to register), etc.

In some examples, the blockchain application 518 may include hash/match module 522 that is configured to receive personal information, hash the personal information according to the blockchain key 520 (e.g., using a cryptographic key of the blockchain, formatting the personal information according to a formulation specified by the blockchain key 520 before hashing), and attempt to match the hashed personal information to verification(s)/denial(s) in the blockchain ledger 526. In some examples, the criteria for determining whether a verification/denial is a match may be specified by the blockchain key or according to criteria set by an institution associated with the example blockchain node 502. For consistency, the match criteria may be defined by the blockchain system.

In some examples, the mining module 524 may cause the processor(s) 508 to conduct example process 400.

In some examples, the authentication model 528 may receive verification(s)/denial(s) matched to the hashed personal information and determine whether to authenticate an entity associated with the personal information. In some examples, the authentication model 528 may include an algorithm generated by an institution associated with the example blockchain node 502. In this example, the authentication model 528 may be different between two blockchain nodes. In an additional or alternate example, the authentication model 528 may include one or more discrete algorithms known to the blockchain system. In this example, an institution associated with the example blockchain node 502 may be presented with an option to select one of the authentication algorithms. This may be more suiting for a blockchain system that identifies a "verification mode" in the verification data associated with a verification stored in the blockchain. The authentication model 528 may, in turn, transmit an indication of authentication/denial to an entity device, mining module 524, and/or another node of the blockchain. The authentication model 528 may, in some examples, additionally include the hashed personal information and other verification data (e.g., verification data/ mode/identifier, when the authentication model 528 transmits the indication to the mining module 524 or to another blockchain node).

The blockchain application 518 may also determine instructions for generating a user interface at an entity computing device and/or transmitting and receiving the various requests discussed herein (e.g., requests for corrections, blocking the entity device from taking an action, authorizing the entity device to take an action, for example, in relation to the computing service(s) 530 or in relation to an application operating on the entity computing device and that is associated with the computing service(s) 530). In some examples, the blockchain application 518 may generate and/or send the instructions to the entity device responsive to receiving a request to cause an action at the computing service(s) 530 (or via an application associated with the computing service(s) 530 and that is operating on the entity device). In some examples, the blockchain application 518 may send an electronic communication (e.g., an email, a text message, a push notification, a blockchain transaction, an instruction, etc.) to the entity device such that the entity device displays a mechanism, the actuation of which causes personal information, blockchain node 502. For example, the mechanism may include a web form that limits acceptable forms of input, fuzzy matching functionality that requests an affirmation that entered personal information is correct or a correction to the entered personal information, etc. The mechanism may also be activatable for providing other additional personal information such as, for example, a picture of a driver's license, a picture of a business license, a picture of a charter, a digital certification, etc.

FIGS. 2A-4 include flow diagrams illustrating example processes according to some implementations. The processes of FIGS. 2A-4 include illustrations of collections of blocks in logical flow diagrams, which represent a sequence of operations, some or all of which can be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks may be combined in any order and/or in parallel to implement the process, or alternative processes, and not all of the blocks need be executed. Further, in some examples, some or all of the operations illustrated in one or more of FIGS. 2A-2G may be combined with some or all of the operations illustrated in FIGS. 3A & 3B and/or 4. For discussion purposes, the processes are described with reference to the environments, architectures and devices described in the examples herein, although the processes can be implemented in a wide variety of other environments, architectures and devices.

Various instructions, methods and techniques described herein may be considered in the general context of computer-executable instructions, such as program modules stored on computer-readable media, and executed by the processor(s) herein. Generally, program modules include routines, programs, objects, components, data structures, etc., for performing particular tasks or implementing particular abstract data types. These program modules, and the like, may be executed as native code or can be downloaded and executed, such as in a virtual machine or other just-in-time compilation execution environment. Typically, the functionality of the program modules may be combined or distributed as desired in various implementations. An implementation of these modules and techniques may be stored on computer storage media or transmitted across some form of communication media.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The modules described herein represent instructions that can be stored in any type of computer-readable medium and can be implemented in software and/or hardware. All of the methods and processes described above can be embodied in, and fully automated via, software code modules and/or computer-executable instructions executed by one or more computers or processors, hardware, or some combination thereof. Some or all of the methods can alternatively be embodied in specialized computer hardware.

Conditional language such as, among others, "can," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. can be either X, Y, or Z, or any combination thereof, including multiples of each element. Unless explicitly described as singular, "a" means singular and plural.

While one or more examples of the techniques have been described, various alterations, additions, permutations and equivalents thereof are included within the scope of the techniques.

In the description of embodiments, reference is made to the accompanying drawings that form a part hereof, which show by way of illustration specific embodiments of the claimed subject matter. It is to be understood that other embodiments may be used and that changes or alterations, such as structural changes, may be made. Such embodiments, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other embodiments using alternative orderings of the computations could be readily implemented. In addition to being reordered, the computations could also be decomposed into sub-computations with the same results.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions can be deleted, or executed out of order from that shown or discussed, including substantially synchronously or in reverse order, depending on the functionality involved as would be understood by those skilled in the art.

It should be emphasized that many variations and modifications can be made to the above-described examples, the elements of which are to be understood as being among other acceptable examples. All such modifications and variations are intended to be included herein within the scope of this disclosure and protected by the following claims.

What is claimed is:

1. A computer-implemented method comprising:
   receiving, at a serving computing device, data from an entity computing device indicating personal information, the personal information associated with an entity;
   hashing, at the serving computing device and using a cryptographic salt, the personal information as hashed personal information;
   computing, at the serving computing device, a first similarity value of the hashed personal information to a first hash stored on a blockchain platform, the first hash being associated with a verification stored on the blockchain platform;
   determining, at the serving computing device and based at least in part on the computing, that the similarity value (1) does not meet a threshold match value or (2) meets or exceeds the threshold match value;
   computing, at the serving computing device, a second similarity value of the hashed personal information to a second hash associated with a denial;
   denying the entity, based at least in part on determining that the second similarity value meets or exceeds the threshold match value; and
   transmitting, based at least in part on the denying and to the entity computing device, an indication of denial.

2. The computer-implemented method of claim 1, further comprising:
   receiving a request from the entity computing device to cause an action at the serving computing device,
   wherein receiving the data indicating the personal information is associated, at least in part, with receiving the request.

3. The computer-implemented method of claim 2, further comprising:
   authenticating the entity, based at least in part on determining that the similarity value meets or exceeds the threshold match value associated with the first hash associated with the verification; and causing, based at least in part on the authenticating, at least part of the action to be accomplished at the serving computing device.

4. The computer-implemented method of claim 1, further comprising:
receiving, based at least in part on the transmitting, a correction to the personal information or additional personal information.

5. The computer-implemented method of claim 1, wherein the similarity value not meeting the threshold match value indicates that the hashed personal information does not match the first hash and the computer-implemented method further comprising:
transmitting the personal information to a third-party authentication system, based at least in part on determining that the hashed personal information does not match any of the hashes stored in the blockchain; and
receiving, based at least in part on the transmitting the personal information, a verification or a denial from the third-party authentication system.

6. The computer-implemented method of claim 1, further comprising:
transmitting a notification of the denying to at least one computing device associated with the blockchain, the notification including the hashed personal information and causing the hashed personal information to be included in the blockchain.

7. A system comprising:
one or more processors; and
memory storing instructions that, when executed by the one or more processors, cause the one or more processors to:
store a blockchain ledger referencing hashes associated with verifications and denials, wherein an individual verification of the verifications is associated with a first hash of first personal information associated with a user;
receive, from a computing device, a verification request message including personal information of a requesting user;
receive a cryptographic salt;
hash, using a hashing function and the cryptographic salt, the personal information as hashed personal information;
compute a plurality of similarity scores between the hashed personal information and the hashes stored on the blockchain ledger, wherein a first similarity score of the plurality of similarity scores indicates a similarity value between the hashed personal information and an individual hash of the hashes stored on the blockchain ledger, wherein the computing includes computing a similarity value of the hashed personal information to a second hash associated with a denial;
deny an entity based at least in part on determining that the similarity value meets or exceeds a threshold value; and
transmit, based at least in part on the denying and to a device associated with the entity, an indication of the denial.

8. The system of claim 7, wherein the instructions further cause the one or more processors to:
determine that the hashed personal information matches at least the first hash associated with the individual verification; and
authenticate the user associated with the personal information, based at least in part on determining that the hashed personal information matches the first hash associated with the individual verification.

9. The system of claim 8, wherein the instructions further cause the one or more processors to:
receive, from the computing device, a request to cause an action at the system, wherein receiving the personal information is based at least in part on receiving the request; and
initiate at least part of the action, based at least in part on authenticating the entity.

10. The system of claim 8, wherein:
the first hash includes multiple first hashes corresponding to different portions of the first personal information;
the hashed personal information includes multiple second hashes corresponding to different portions of the personal information; and
determining that a similarity value meets or exceeds the threshold value includes determining that a predetermined number or a predetermined percentage of the multiple second hashes matches the multiple first hashes.

11. The system of claim 7, wherein the instructions further cause the one or more processors to:
identify, based at least in part on finding hashes that are associated with similarity scores that meet or exceed the threshold value, at least one of (1) one or more of the verifications or (2) one or more denials referenced in the blockchain ledger;
authenticate or deny an entity associated with the personal information, based at least in part on at least one of the one or more of the verifications or the one or more denials; and
transmit, to one or more other devices participating in a blockchain associated with the blockchain ledger, a notification of the authentication or the denial.

12. The system of claim 7, wherein the instructions further cause the one or more processors to:
receive, from another computing device, a notification of an updated blockchain ledger that includes a new block, wherein the new block includes at least a new hash and a new verification or a new denial; and
replace, in storage, the blockchain ledger with the updated blockchain ledger.

13. A non-transitory computer-readable medium storing instructions that, when executed by one or more processors, cause the one or more processors to:
access a blockchain ledger stored in a memory, wherein the blockchain ledger indicates verifications and denials of identities and hashes associated therewith, and further wherein an individual verification of the verifications is associated at least one hash corresponding to an identity that was verified;
receive, from a computing device, personal information associated with an entity;
hash, as hashed personal information and using a cryptographic salt, the personal information;
search the blockchain ledger for at least one match between the hashed personal information and the hashes;
determine a similarity value of the hashed personal information to a hash associated with a denial;
deny the entity based at least in part on determining that the similarity value meets or exceeds a threshold match value; and
transmit, to the computing device, a denial based at least in part the denying.

14. The non-transitory computer-readable medium of claim 13, wherein the hashes recorded in the blockchain are generated using the cryptographic salt.

15. The non-transitory computer-readable medium of claim 13, wherein:
receiving the personal information is associated, at least in part, with receiving a request to cause an action by the one or more processors;
transmitting the denial to the computing device further includes an indication that the entity is denied to cause at least part of the action; and
the instructions further cause the one or more processors to refrain from make completion of the action available to the computing device.

16. The non-transitory computer-readable medium of claim 15, wherein the instructions further cause the one or more processors to transmit a notification of the denial to a second computing device associated with a blockchain system, wherein the blockchain system is associated with the blockchain ledger and the notification causes the blockchain ledger to update across the blockchain system to include the denial.

17. The non-transitory computer-readable medium of claim 13, wherein:
receiving the personal information is associated, at least in part, with receiving a request to cause an action by the one or more processors;
transmitting the denial to the computing device further includes an indication that the entity is not authorized to cause at least part of the action; and
the instructions further cause the one or more processors to block the computing device from completing the action.

18. The non-transitory computer-readable medium of claim 17, wherein:
the indication further includes an activatable mechanism for at least one of correcting the personal information or providing additional personal information; and
the instructions further cause the one or more processors to re-search the blockchain ledger based at least in part on at least one of a correction of the personal information or additional personal information.

\* \* \* \* \*